M. L. SCHWARTZMAN & A. R. SIMON.
YARN MEASURING DEVICE.
APPLICATION FILED APR. 12, 1916.

1,248,174.

Patented Nov. 27, 1917.

Witness
W. S. McDowell

Inventors
M. L. Schwartzman,
A. R. Simon.
By Victor J. Evans
Attorney

UNITED STATES PATENT OFFICE.

M. LESTER SCHWARTZMAN AND ALBERT RICHARD SIMON, OF PHILADELPHIA, PENNSYLVANIA.

YARN-MEASURING DEVICE.

1,248,174.

Specification of Letters Patent.

Patented Nov. 27, 1917.

Application filed April 12, 1916. Serial No. 90,692.

*To all whom it may concern:*

Be it known that we, M. LESTER SCHWARTZMAN and ALBERT RICHARD SIMON, citizens of the United States, residing at Philadelphia, in the county of Philadelphia and State of Pennsylvania, have invented new and useful Improvements in Yarn-Measuring Devices, of which the following is a specification.

The invention relates to textiles and the apparatus used in connection therewith, and has for an object to provide a simple device for measuring strands of yarn and the like.

In measuring the length of a piece of yarn the present customary method is to stretch the piece of yarn over or adjacent to an ordinary steel or other scale and, holding the yarn on or adjacent to the scale with the fingers, the operator reads the particular graduations on the scale denoting the length of a piece of yarn. This method however, has been found to be decidedly inaccurate and primarily so for the reason that in placing the piece of yarn against the scale and holding the same taut, the operator ofttimes stretches the yarn beyond its normal taut length thus resulting in an inaccurate determination of the length of the yarn.

The present invention aims to provide a simple structure including means for applying the yarn to secure the ends and a scale element for measuring the length of a piece of yarn when the same has been drawn taut.

Figure 1:
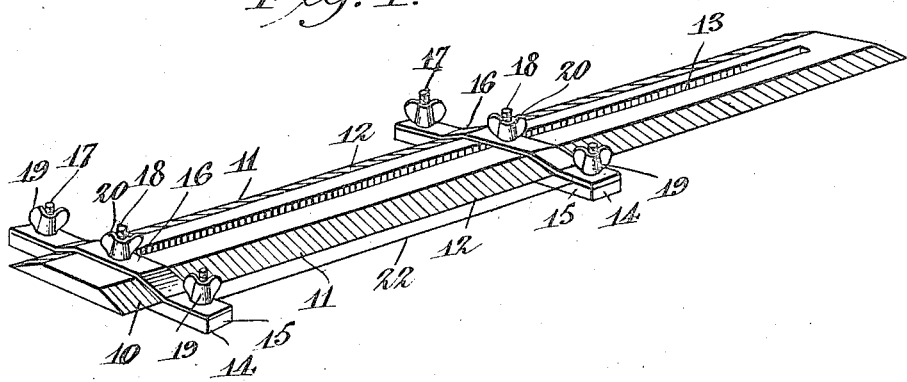
Figure 2:
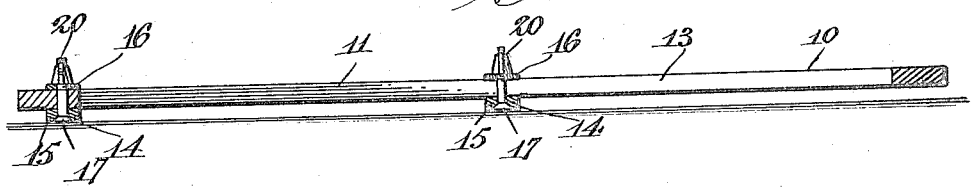
Figure 3:
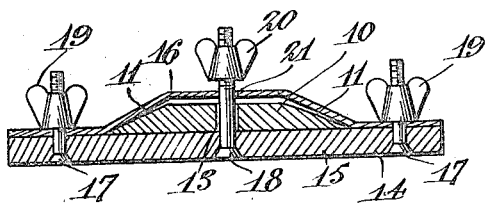
Figure 4:
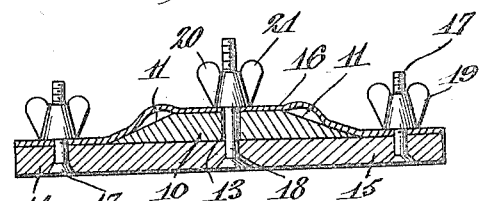

In the further disclosure of the invention reference is to be had to the accompanying drawings, constituting a part of this specification, in which similar characters of reference denote corresponding parts in all the views, and in which Figure 1 is a perspective view of the device showing the same in use, Fig. 2 is a vertical longitudinal sectional view taken through the device, Fig. 3 is a vertical transverse sectional view with one of the clamping elements shown in position to slide, and Fig. 4 is a similar view showing the clamping element clamped rigid relative to the scale thereon.

Referring more particularly to the views, there is shown a scale element 10 which may be of any desired form but particularly constructed as shown with inclined faces 11 having graduations 12 thereon, a central longitudinal slot 13 being formed in the scale element, as shown. A plurality of clamping members 14 are mounted upon the scale element and each consists of a bar 15 passing transversely beneath the scale element 10, a flexible clamping strip 16 disposed upon the bar and having a portion thereof traversing the scale element, and suitable screws 17, 18 having clamping nuts 19, 20, respectively. The central screw 18 in each clamp passes upwardly through the bar 15, and through the slot 13 in the scale element, said screw also passing through an opening 21 in the flexible strip 16. The smaller screws 17 pass upwardly through the bar 15 and through the ends of the flexible strip.

In the use of the device a piece or strand of yarn 22 has its ends secured in the clamping members, between an end of the bar 15 and an end of the flexible strip 16 of each clamping member, the particular thumb nuts on those ends of the clamping members being then screwed down upon the flexible strips to rigidly secure the same. The thumb nut on the center screw of one clamping member, namely the one at the zero graduation of the scale, is now screwed down to rigidly clamp the said clamping member to the scale element, as shown for instance in Fig. 4 and the other clamping member is then slid along the scale element until the yarn is substantially taut. The centrally disposed thumb nut of this clamping member is now screwed down to bind the clamping member against further movement along the scale element and the particular reading or graduation on the scale element adjacent the last mentioned clamping member being properly noted, will indicate the length of the piece of yarn that is being measured, Fig. 4 clearly showing the clamped position of the clamping member relative to the scale element.

From the foregoing description it will be clear that the device described consists of few and simple parts, and that a person with very little practice soon becomes an expert in the measurement of yarns in the manner described when the device described is used, the said device insuring accuracy in the measurement of the yarn and to a great extent preventing inaccurate readings due to negligence.

Having described our invention, we claim:

1. A yarn measuring device comprising a longitudinal slotted scale element and a plurality of clamping members on said scale element for clamping a piece of yarn in position to be measured by the scale element, said clamping members each consisting of a bar passing transversely beneath the scale element, a flexible strip on the bar and traversing the scale element, said strip forming one of the clamping portions for clamping an end of the yarn, screws passing through the bar and flexible strip, nuts on the screws for binding the flexible strip against the bar, a screw passing through the bar, the slot in the scale element and the flexible strip and a nut on the last mentioned screw for clamping the bar rigidly against movement on the scale element.

2. A yarn measuring device comprising a longitudinally slotted scale element and clamping members on said scale element, for clamping yarns in position to be measured by the scale element, said clamping members each consisting of a bar, a flexible strip between which and the bar the yarn is to be clamped, means for clamping the ends of the yarn rigidly to the clamping member and means for clamping the bar and flexible strip rigidly on the scale element.

3. A yarn measuring device comprising a scale element and yarn clamping members including flexible clamping strips movably mounted on said scale element.

4. A yarn measuring device comprising a scale element, yarn clamping members each including rigid and flexible clamping elements movably mounted on said scale element, and means for holding the rigid and flexible elements of the respective clamping members against movement on the scale element.

5. A yarn measuring device comprising a graduated linear measuring element, and yarn holding means upon said element for securing yarns in position to be measured by said element, said means embodying a pair of spaced flexible clamping elements engaging the measuring element, and means associated with each element for holding the same in clamping position.

6. A yarn measuring device comprising a scale element having a scale surface upon one of its sides, a clamp comprising a rigid member and a flexible member arranged to engage the opposite sides of said scale element, and means for connecting said members to maintain the flexible member in clamping relationship to said scale surface.

7. A yarn measuring device comprising a linear measuring element having a longitudinally extending scale surface, and clamps extending transversely of said element, each comprising a rigid member extending across the back of said element, a flexible member extending across the scale side of said element, means for holding said members assembled adjustably upon the scale element, and means adjustably connecting the members for clamping and releasing actions.

In testimony whereof we affix our signatures.

M. LESTER SCHWARTZMAN.
A. RICHARD SIMON.

Copies of this patent may be obtained for five cents each, by addressing the "Commissioner of Patents, Washington, D. C."